United States Patent
Yati

(10) Patent No.: US 9,940,704 B2
(45) Date of Patent: Apr. 10, 2018

(54) PRE-LAYER DEFECT SITE REVIEW USING DESIGN

(71) Applicant: KLA-TENCOR CORPORATION, Milpitas, CA (US)

(72) Inventor: Arpit Yati, Lucknow (IN)

(73) Assignee: KLA—Tencor Corporation, Milpitas, CA (US)

( * ) Notice: Subject to any disclaimer, the term of this patent is extended or adjusted under 35 U.S.C. 154(b) by 0 days.

(21) Appl. No.: 15/183,919

(22) Filed: Jun. 16, 2016

(65) Prior Publication Data

US 2016/0371831 A1 Dec. 22, 2016

Related U.S. Application Data

(60) Provisional application No. 62/204,328, filed on Aug. 12, 2015.

(30) Foreign Application Priority Data

Jun. 19, 2015 (IN) ............................ 3079/CHE/2015

(51) Int. Cl.
  *G06T 7/00* (2017.01)
  *G06T 7/33* (2017.01)
  *G06K 9/00* (2006.01)

(52) U.S. Cl.
  CPC ............ *G06T 7/0006* (2013.01); *G06T 7/337* (2017.01); *G06T 2207/10061* (2013.01); *G06T 2207/30148* (2013.01)

(58) Field of Classification Search
  CPC ................... G06T 7/0006; G06T 7/337; G06T 2207/10061; G06T 2207/30148
  See application file for complete search history.

(56) References Cited

U.S. PATENT DOCUMENTS

| | | | |
|---|---|---|---|
| 6,035,244 A | 3/2000 | Chen et al. | |
| 6,468,815 B1 | 10/2002 | Steffan et al. | |
| 7,570,796 B2 * | 8/2009 | Zafar | G03F 1/84 |
| | | | 382/144 |
| 8,016,585 B2 * | 9/2011 | Komoriya | B29C 33/424 |
| | | | 264/293 |
| 8,750,597 B2 * | 6/2014 | Patterson | G06T 7/001 |
| | | | 382/151 |
| 9,251,581 B1 * | 2/2016 | Chen | G06T 7/001 |
| 9,607,724 B2 * | 3/2017 | Adler | G21K 7/00 |
| 2005/0152594 A1 * | 7/2005 | Jau | G06T 7/0004 |
| | | | 382/145 |
| 2006/0142971 A1 * | 6/2006 | Reich | G01C 17/00 |
| | | | 702/150 |
| 2008/0032429 A1 | 2/2008 | Chen et al. | |
| 2012/0131529 A1 | 5/2012 | Hayakawa et al. | |
| 2016/0371831 A1 * | 12/2016 | Yati | G06T 7/0006 |

FOREIGN PATENT DOCUMENTS

WO 2007120279 10/2007

OTHER PUBLICATIONS

ISA/KR, International Search Report, PCT/US2016/038315 dated Sep. 29, 2016.

* cited by examiner

*Primary Examiner* — Gregory M Desire
(74) *Attorney, Agent, or Firm* — Hodgson Russ LLP

(57) ABSTRACT

A system and method to image a layer of a wafer based on a coordinate of a defect in a pre-layer of the wafer are disclosed. A design file for the current layer can be aligned to the wafer using an image of the current layer. A design file for a previous layer can be aligned to the design file for the current layer.

18 Claims, 5 Drawing Sheets

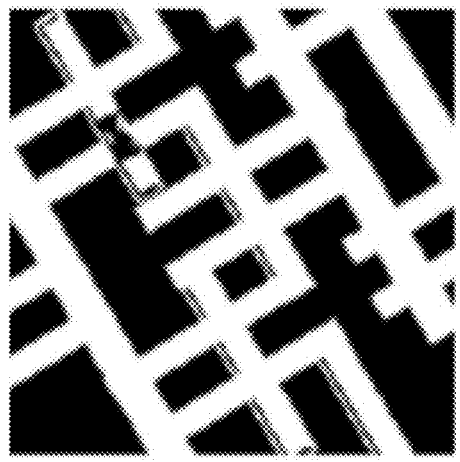
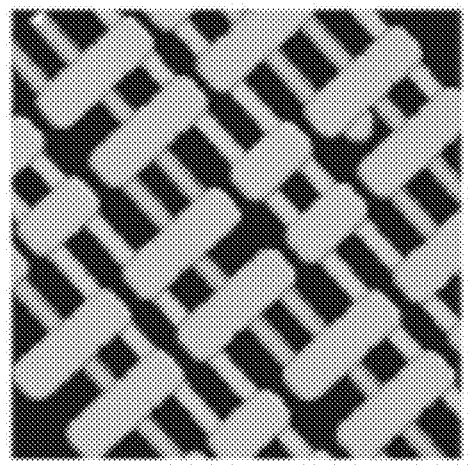
FIG. 2    FIG. 3
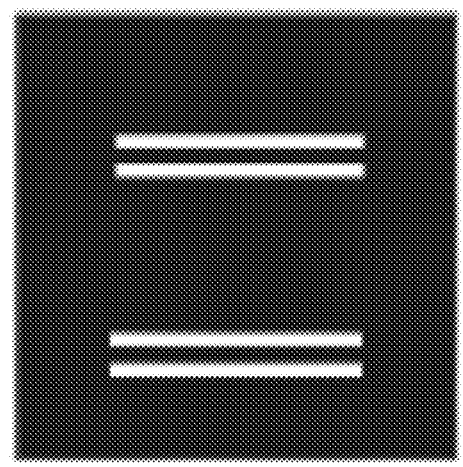
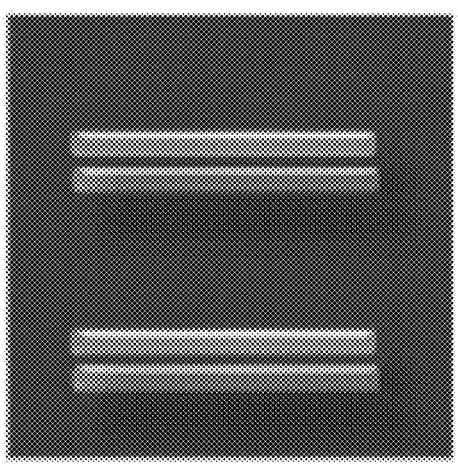
FIG. 4    FIG. 5

PRE-LAYER DEFECT SITE REVIEW USING DESIGN

CROSS-REFERENCE TO RELATED APPLICATIONS

This application claims priority to the patent application filed Jun. 19, 2015 and assigned Indian App. No. 3079/CHE/2015 and to the provisional patent application filed Aug. 12, 2015 and assigned U.S. App. No. 62/204,328, the disclosures of which are hereby incorporated by reference.

FIELD OF THE DISCLOSURE

This disclosure relates to semiconductor wafer defect review and analysis.

BACKGROUND OF THE DISCLOSURE

Wafer inspection systems help a semiconductor manufacturer increase and maintain integrated circuit (IC) chip yields by detecting defects that occur during the manufacturing process. One purpose of inspection systems is to monitor whether a manufacturing process meets specifications. The inspection system indicates the problem and/or the source of the problem if the manufacturing process is outside the scope of established norms, which the semiconductor manufacturer can then address.

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

A semiconductor wafer may include multiple layers. A defect in one layer can impact manufacturing in layers that are later formed. A defect also can affect wafer yield regardless of the layer where the defect is located. The site with the defect in the earlier-formed or previously-formed layer can be referred to as a "pre-layer defect site." It can be beneficial to monitor a defect and its impact on subsequent layers. Thus, semiconductor manufacturers may review pre-layer defect sites to improve high-volume production.

During semiconductor manufacturing, potential defects on each layer of a wafer can be found using a defect inspection tool, such as those using broad band plasma, laser scanning, or an electron beam. The defect locations are then reviewed under, for example, a scanning electron microscope (SEM) with high resolution imaging to confirm the existence of and/or type of defect.

It is difficult to monitor an impact to one or more subsequent layers caused by a defect on an earlier-formed layer. The images of various wafer layers are not aligned. Therefore, viewing a site of the defect in a layer with the coordinates from a previously-formed layer using, for example, an SEM tool can result in viewing the wrong region of a wafer. Deskewing layer images is not possible because the coordinate system may be different for different layers of the wafer. Users frequently guess whether, for example, an SEM image is the region that corresponds to the pre-layer defect site. Semiconductor manufacturers waste time confirming that a particular site in an image corresponds to the pre-layer defect site. This comparison is complicated because an approximate pattern match may only be possible for a few layers. If the images are more than a few layers apart, then the patterns in the image may be different enough that it may be impossible to confirm that the features in the image of the later-formed layer correspond to the location of the pre-layer defect.

Therefore, what is needed is an improved system and method to inspect wafers.

BRIEF SUMMARY OF THE DISCLOSURE

In a first embodiment, a system is provided. The system comprises a defect review tool and a controller configured to communicate with the defect review tool. The defect review tool includes a stage configured to clamp a wafer and an image generation system configured to generate an image of a layer of a surface of the wafer. The controller is configured to align a design file for a current layer of the wafer to an image of the current layer; align a design file for a previous layer of the wafer to the design file for the current layer; and identify a region of the image of the current layer based on a coordinate of a defect in the previous layer. The previous layer is formed prior to the current layer. The region corresponds to the coordinate of the defect in the previous layer. The image of the current layer may be a scanning electron microscope image.

The controller can include a processor, a storage device in electronic communication with the processor, and a communication port in electronic communication with the processor.

At least one die corner of the wafer may be marked. The controller can be further configured to adjust the die corners to a die coordinate system for the previous layer after aligning the design file for the previous layer.

The controller can be further configured to deskew the image of the current layer.

The controller can be further configured to generate a coordinate system for the current layer and generate a corresponding coordinate system for the previous layer.

The controller can be further configured to align an image of the previous layer to at least one of the design file for the previous layer or the design file for the current layer.

The image generation system may be configured to use at least one of an electron beam, a broad band plasma, or a laser.

In a second embodiment, a method is provided. The method comprises aligning a wafer in a defect review tool using a stage; marking at least one die corner of the wafer; aligning using a controller a design file for a current layer of the wafer to an image of the current layer; aligning using the controller a design file for a previous layer of the wafer to the design file for the current layer; and identifying a region of the image of the current layer based on a coordinate of a defect in the previous layer using the controller. The previous layer is formed prior to the current layer. The region corresponds to the coordinate of the defect in the previous layer. The image of the current layer can be a scanning electron microscope image.

The method may further comprise adjusting the die corners to a die coordinate system for the previous layer after aligning the design file for the previous layer.

The method may further comprise generating lots with defect site images of the current layer and the previous layer using the controller.

The method may further comprise deskewing the image of the current layer using the controller.

The method may further comprise generating a coordinate system for the current layer and generating a corresponding coordinate system for the previous layer using the controller.

The method may further comprise aligning an image of the previous layer to at least one of the design file for the previous layer or the design file for the current layer.

The method may further comprise identifying, using the controller, the location of a defect in an image of the previous layer prior to identifying the region of the image of the current layer. The image of the previous layer can be aligned to the design file for the previous layer.

DESCRIPTION OF THE DRAWINGS

For a fuller understanding of the nature and objects of the disclosure, reference should be made to the following detailed description taken in conjunction with the accompanying drawings, in which:

FIGS. 2-5 are exemplary pre-layer and current layer designs and SEM images;

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments of the systems and methods disclosed herein enable improved inspection of a layer of a wafer or defect monitoring for a wafer. A region of a layer can be reviewed or inspected quickly based on a position of a previous layer ("pre-layer") defect site. Semiconductor manufacturers can monitor pre-layer defect sites at multiple stages or times of the manufacturing process. For example, pre-layer defect sites can be monitored during or after some or all subsequent process steps. Classification of defects in a pre-layer can enable semiconductor manufacturers to focus on yield impacting defect of interest (DOI) types that affect multiple layers of a wafer. Embodiments of the systems and methods disclosed herein also provide improved and/or faster inspection throughput and can eliminate a manual review technique.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Figure 1:
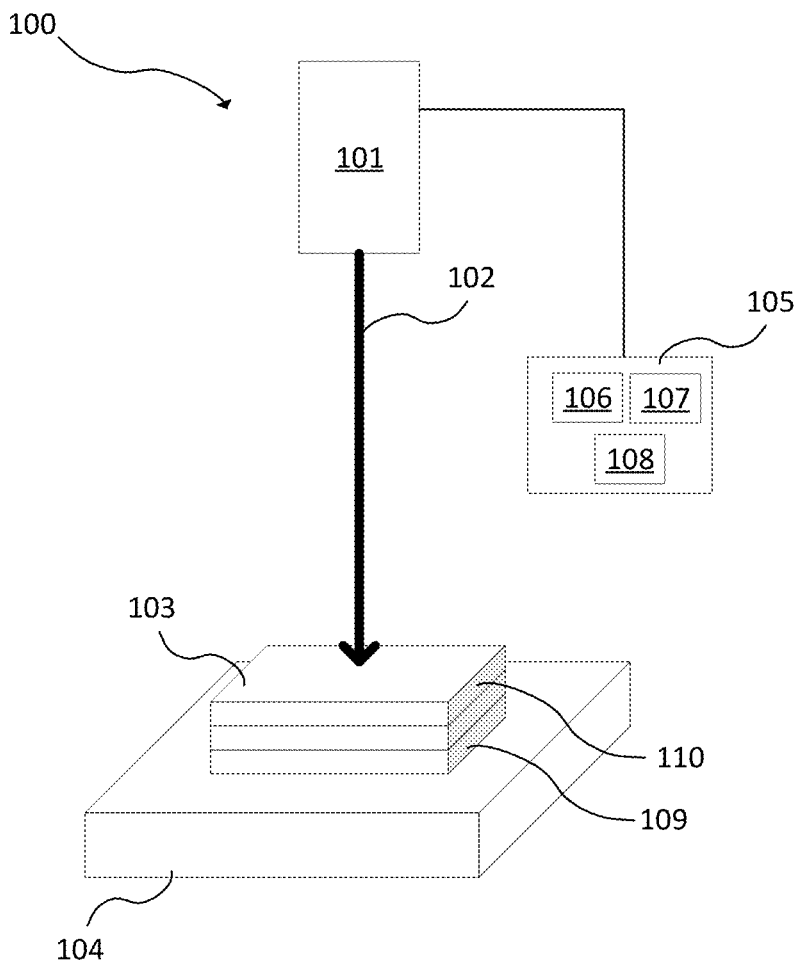
FIG. 1 is a block diagram of a defect review tool in accordance with the present disclosure.

FIG. 1 is a block diagram of a defect review tool 100 in accordance with the present disclosure. The defect review tool 100 includes a stage 104 configured to clamp a wafer 103. The stage 104 may be configured to move or rotate in one, two, or three axes.

As seen in FIG. 1, the wafer 103 includes multiple layers. The current layer 110 is formed after the pre-layer 109. But a defect in the pre-layer 109 can affect the current layer 110. While the current layer 110 is illustrated as being imaged in FIG. 1, the pre-layer 109 may have been imaged prior to formation of the current layer 110. More or fewer layers are possible than the three layers illustrated in FIG. 1.

The defect review tool 100 also includes an image generation system 101 configured to generate an image of a surface of the wafer 103. The image may be for a particular layer of the wafer 103. In this example, the image generation system 101 produces an electron beam 102 to generate an image of the wafer 103. Other image generation systems 101 are possible, such as those that use broad band plasma or laser scanning.

In a particular example, the defect review tool 100 is part of or is a scanning electron microscope (SEM). Images of the wafer 103 are generated by scanning the wafer 103 with a focused electron beam 102. The electrons are used to produce signals that contain information about the surface topography and composition of the wafer 103. The electron beam 102 can be scanned in a raster scan pattern, and the position of the electron beam 102 can be combined with the detected signal to produce an image.

The defect review tool 100 communicates with a controller 105. For example, the controller 105 can communicate with the image generation system 101 or other components of the defect review tool 100. The controller 105 can include a processor 106, a storage device 107 in electronic communication with the processor 106, and a communication port 108 in electronic communication with the processor 106. It is to be appreciated that the controller 105 may be implemented in practice by any combination of hardware, software, and firmware. Also, its functions as described herein may be performed by one unit, or divided up among different components, each of which may be implemented in turn by any combination of hardware, software and firmware. Program code or instructions for the controller 105 to implement the various methods and functions described herein may be stored in controller readable storage media, such as a memory, within the controller 105, external to the controller 105, or combinations thereof.

FIGS. 2-5 are exemplary pre-layer and current layer designs and SEM images. FIG. 2 is a design file for a pre-layer and FIG. 3 is a corresponding SEM image for the pre-layer. FIG. 4 is a design file for a current layer and FIG. 5 is a corresponding SEM image for the current layer. The design files illustrated in FIGS. 2 and 4 and the SEM images illustrated in FIGS. 3 and 5 correspond to the same region of the wafer in this example. As seen when comparing FIGS.

3 and 5, the images of the different layers of a wafer can vary, which can make it difficult to pinpoint the location of a pre-layer defect site in a later-formed layer of a wafer.

Figure 6:
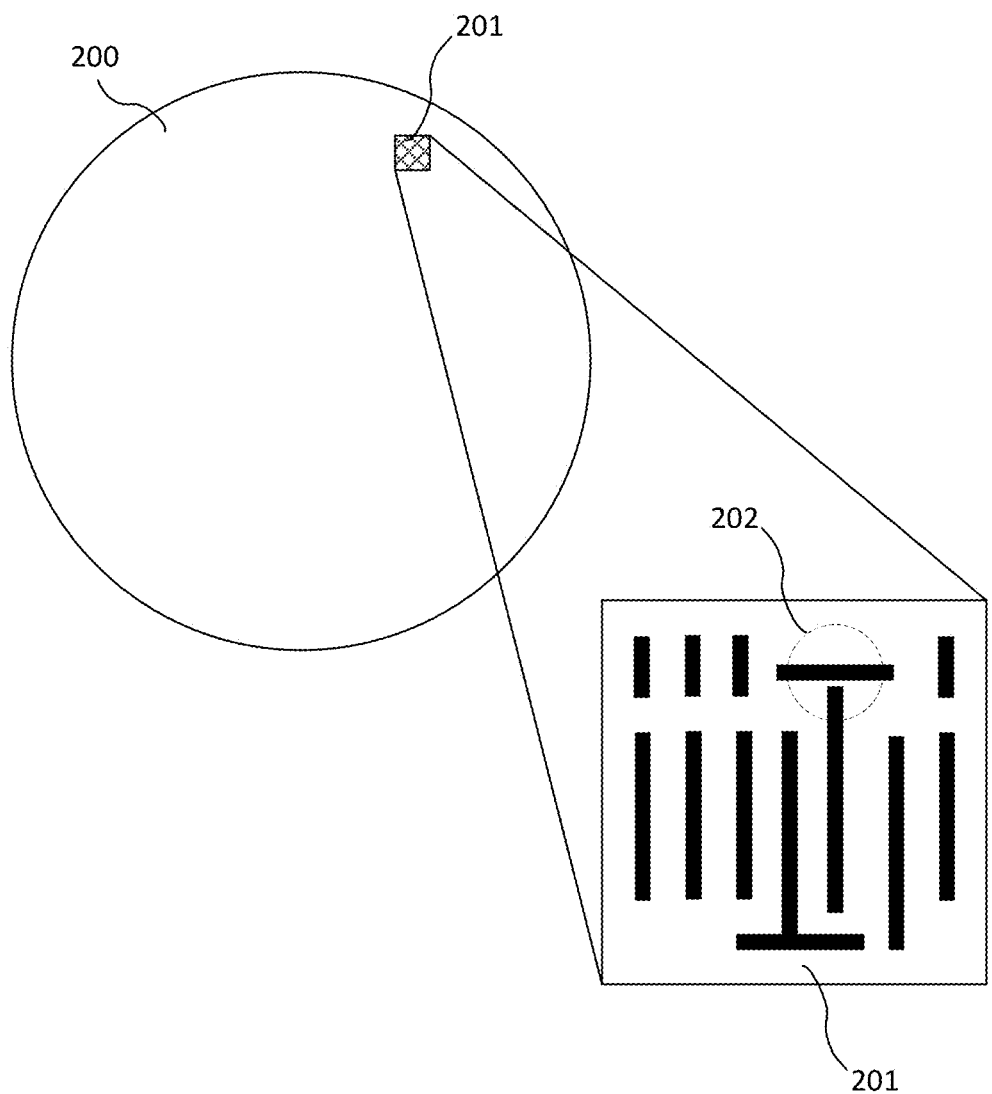
FIG. 6 is an exemplary pre-layer image.

FIG. 6 is an exemplary pre-layer image. The region 201 of the wafer 200 is shown in close-up. The region 201 can correspond to a die or to another region of the wafer. In the region 201 is a pre-layer defect site 202 (circled in dashed line). The defect in the pre-layer defect site 202 may be any defect found during semiconductor manufacturing. For example, the defect may be a particle or contamination, pattern defect, scratch, etch profile defect, etch selectivity issue, incorrect removal during planarization, critical dimension issue, overlay issue, and another types of defect.

Figure 7:
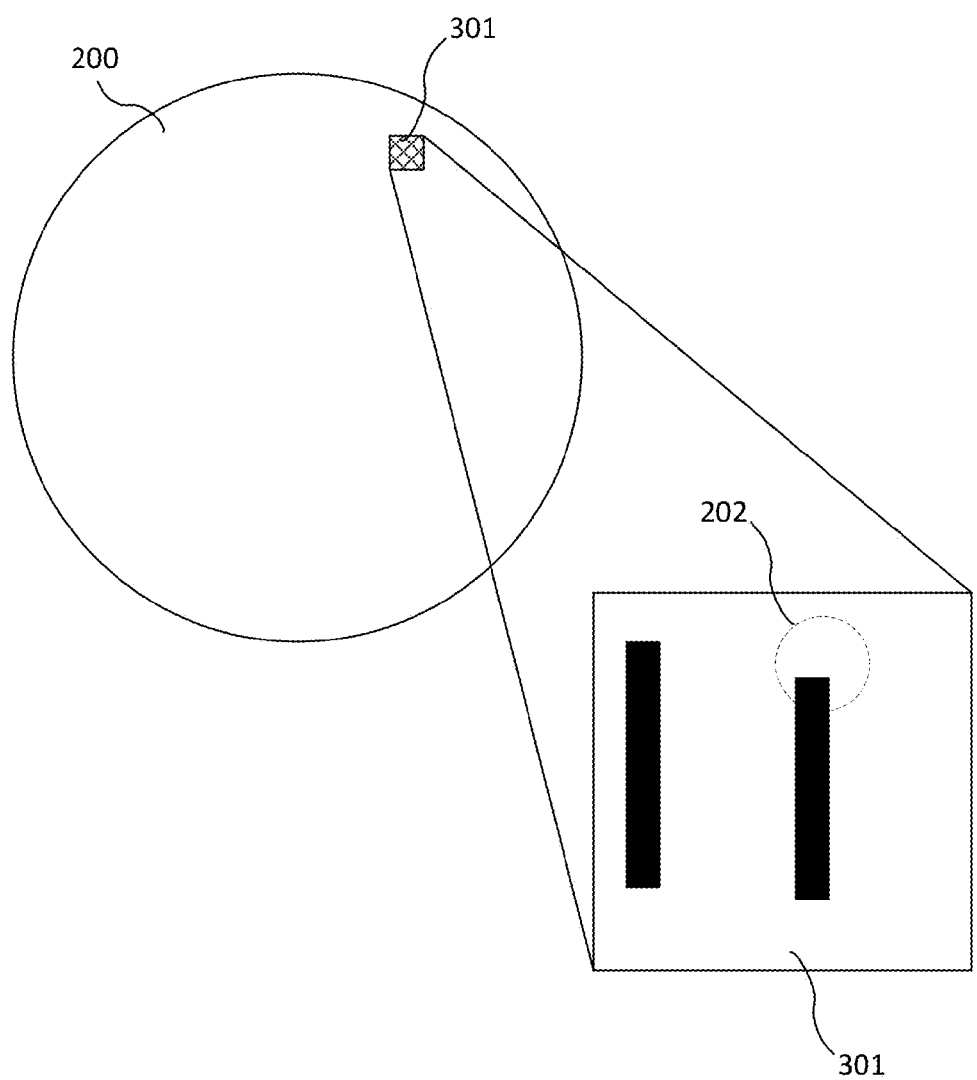
FIG. 7 is an exemplary current layer image.

FIG. 7 is an exemplary current layer image. The region 301 of the current layer corresponds to the region 201. However, the current layer in FIG. 7 is different from the pre-layer in FIG. 6. The previous layer in FIG. 6 is formed prior to the current layer in FIG. 7. The current layer in FIG. 7 may be disposed directly on the pre-layer of FIG. 6. The current layer in FIG. 7 also may be separated from the pre-layer of FIG. 6 by one or more additional layers between the current layer and the pre-layer.

As seen in FIG. 7, the pre-layer defect site 202 on the current layer does not include the devices or features seen in the image of the pre-layer in FIG. 6. However, semiconductor manufacturers are interested in determining the impact of the pre-layer defect site 202 on the current layer or other layers of the wafer 200 formed after the pre-layer in FIG. 6.

Figure 8:
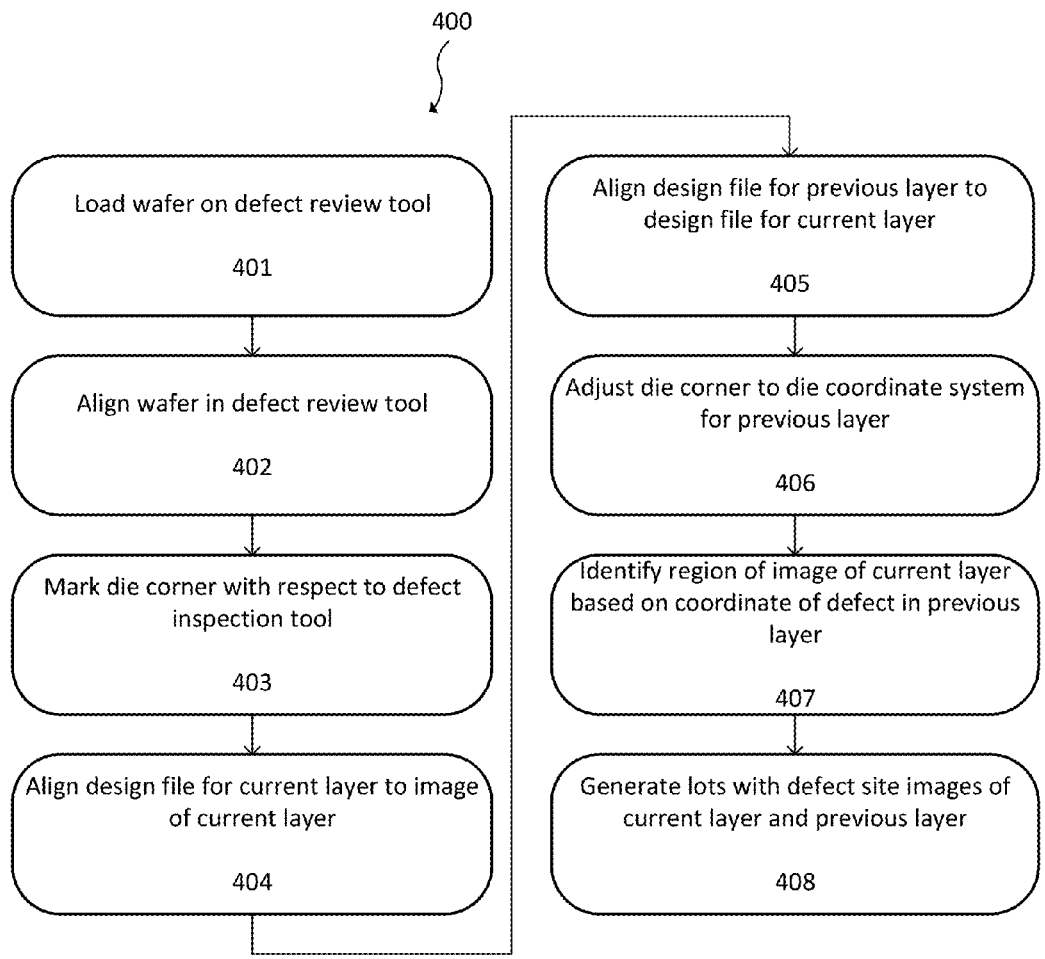
FIG. 8 is a flowchart illustrating an embodiment in accordance with the present disclosure.

FIG. 8 is a flowchart illustrating an embodiment in accordance with the present disclosure. A design file of the pre-layer, which includes the site of the original DOI, and a design file of the current layer are used. The pre-layer was inspected by an inspection tool (e.g., optical inspection, laser scanning, etc.) to find the defect coordinates of the previous layer. These defect coordinates may be reported in the pre-layer design coordinate system. An image, such as an SEM image, of the previous layer is used to confirm the location of the defect site. A coordinate of the defect from the pre-layer in provided, such as by the defect review tool, like the defect review tool 100, or some other defect review tool.

In the method 400, a wafer is loaded on a defect review tool at 401. The wafer is aligned in the defect review tool at 402, such as using a stage in a defect review tool. The defect review tool can be, for example, a scanning electron microscope. The wafer can be placed on a stage that rotates or moves to enable alignment. The image generation system also can be rotated or moved to enable alignment. Rotation or movement in the image generation system can be independent of or complementary to rotation or movement in the stage.

At least one die corner of the wafer is marked with respect to the defect inspection tool at 403. The die corners may be marked on the defect review tool. By marking a die corner, the same die corner can be referenced, visited, or otherwise used in two or more defect inspection tools and/or defect review tools. Thus, the same X-Y coordinate can be used later. The die corners can be marked manually by a user or automatically by taking the inspection tool die corner. This mark may be physical or virtual. The same die corner is marked in the pre-layer, current layer, and in one or more design files to provide fine alignment to the defect site.

A design file for the current layer is aligned to an image of the current layer at 404. The image may be, for example, an SEM image. The design file for the current layer may be aligned to the image for the current layer at the anchor point (e.g., die corner). The location for alignment can be any anchor point with sufficient horizontal and vertical features. This assists in or provides matching of the design coordinate system to the wafer coordinate system. In case of any shift in the design coordinate systems, a transform can be calculated and/or applied to ensure that defects located and reported in the pre-layer design coordinate system are transformed into current layer design coordinate system. Once the defects are reported in the current design coordinate system, a user can visit the pre-layer defect sites because the current layer design is already aligned with current layer wafer coordinate system. While illustrated between 403 and 405, aligning 404 can occur at other points during the method 400.

A design file for a pre-layer is aligned to the design layer for the current layer at 405. In an instance, the two design files are overlapped with the same anchor point (e.g., same die corner), which enables matching of coordinate systems of both layers. The overlap may be perfect or within an acceptable tolerance.

Between 405 and 407, die corners can be adjusted to the die coordinate system for the pre-layer at 406, if necessary. For example, the die corners can be manually or automatically matched. Thus, the same X-Y coordinate can be used later.

An image of the current layer is identified based on a coordinate of a defect in the pre-layer at 407. Thus, the SEM image of the current layer at the coordinate that corresponds to the coordinate of the defect site in the pre-layer can be viewed. Selecting a coordinate on the pre-layer can result in viewing the corresponding coordinate in the current layer. So if a defect site in one layer is known, the location of the defect site can be viewed in one or more later-formed layers on the wafer. In another example, if a defect site in one layer is known, the location of the defect site also can be viewed in one or more previously-formed layers. This may occur to determine if a defect is caused by a pre-layer defect. The images and/or design files of these previously-formed layers may all be aligned to the one layer in this example.

The user can see a defect location marked on the previous layer design clip, current layer design clip, and/or current layer SEM image simultaneously to verify that there is no offset between the sites. In case of any offset, the user can deskew or use an offset correction to make sure that all three coordinate systems are aligned.

Method 400, once aligned, can be run automatically collect SEM images of all pre-layer defect sites.

Optionally, lots with defect site images of the current layer and pre-layer can be generated, such as at 408. Understanding the impact of a defect site in a lot can be used to test semiconductor devices or can be used for yield purposes.

An image of a previous layer can be optionally aligned to a design file for at least the pre-layer. This can occur at any point during the method 400. Aligning the image of the pre-layer to a design file can enable viewing of the defect on the pre-layer. For example, the defect at a coordinate in the pre-layer image can be compared to the defect in the current layer at a corresponding coordinate.

The location of a defect in an image of the pre-layer can be identified or otherwise confirmed prior to identifying or viewing the region of the image of the current layer. The image of the pre-layer may be aligned to the design file for the pre-layer prior to confirming the location of the defect.

In an embodiment, the design files and images for the current layer and pre-layer may all be aligned prior to viewing an image of a region of the current layer based on a coordinate of a defect in the pre-layer.

A controller, such as the controller 105 in FIG. 1, can be configured to perform the steps in method 400. The controller also can instruct the image generation system to image a particular region or regions of the current layer based on defects or potential defects in a pre-layer.

Alignment of a design file to an image for a layer or to another design file may be based on the coordinate system and/or the at least one die corner. An algorithm used for the alignment of the design file to the image for a layer or to another design file also may be intensity-based and/or feature-based. An algorithm used for the alignment of the design file to the image for a layer or to another design file also may use a transformation model, such as a linear transformation model.

A coordinate system can be generated for the current layer and a corresponding coordinate system can be generated for the pre-layer. The coordinate system can be, for example, grid-based, polar, or a three-dimensional coordinate system that uses matrices. In an example, a grid-based X-Y coordinate system is used. The stage of the defect review tool or defect inspection tool can be used to define the coordinate system. The same coordinate system can be used for the pre-layer and current layer. Different coordinate systems can be used for the current layer and pre-layer if there is a known relationship between the two coordinate systems.

The techniques disclosed herein can be automated. For example, automated SEM review may be used. Data management techniques can be used to analyze images from one or more layers on a wafer.

Use of the techniques disclosed herein can help semiconductor manufacturers improve manufacturing processes because pre-layer defects can be identified or monitored earlier or more frequently. The time required to inspect a wafer is reduced, which increases throughput. Classification of defects based on a pre-layer manufacturing step can enable semiconductor manufacturers to focus on yield-impacting DOI types that affect multiple layers of a wafer.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a defect review tool, wherein the defect review tool includes:
      a stage configured to clamp a wafer; and
      an image generation system configured to generate an image of a layer of a surface of the wafer; and
   a controller configured to communicate with the defect review tool, wherein the controller is configured to:
      generate a coordinate system for a current layer and generate a corresponding coordinate system for a previous layer, wherein the coordinate system for the current layer and the coordinate system for the previous layer are each one of a grid-based system, a polar system, or three-dimensional coordinate system that uses matrices;
      align a design file for the current layer of the wafer to an image of the current layer with the coordinate system for the current layer;
      align a design file for the previous layer of the wafer to the design file for the current layer with the coordinate system for the previous layer, wherein the previous layer is formed prior to the current layer; and
      identify a region of the image of the current layer based on a coordinate of a defect in the previous layer, wherein the region corresponds to the coordinate of the defect in the previous layer.

2. The system of claim 1, wherein the controller includes a processor, a storage device in electronic communication with the processor, and a communication port in electronic communication with the processor.

3. The system of claim 1, wherein at least one die corner of the wafer is marked.

4. The system of claim 3, wherein the controller is further configured to adjust the die corners to a die coordinate system for the previous layer after aligning the design file for the previous layer.

5. The system of claim 1, wherein the controller is further configured to deskew the image of the current layer.

6. The system of claim 1, wherein the image of the current layer is a scanning electron microscope image.

7. The system of claim 1, wherein the controller is further configured to align an image of the previous layer to at least one of the design file for the previous layer or the design file for the current layer.

8. The system of claim 1, wherein the image generation system is configured to use at least one of an electron beam, a broad band plasma, or a laser.

9. The system of claim 1, wherein one of the coordinate system for the current layer and the coordinate system for the previous layer is the grid-based system, and wherein the grid-based system uses an X-Y coordinate system.

10. A method comprising:
    aligning a wafer in a defect review tool using a stage;
    marking at least one die corner of the wafer;
    generating a coordinate system for a current layer and generating a corresponding coordinate system for a previous layer using the controller, wherein the coordinate system for the current layer and the coordinate system for the previous layer are each one of a grid-based system, a polar system, or three-dimensional coordinate system that uses matrices;
    aligning using a controller a design file for the current layer of the wafer to an image of the current layer with the coordinate system for the current layer;
    aligning using the controller a design file for the previous layer of the wafer to the design file for the current layer with the coordinate system for the previous layer, wherein the previous layer is formed prior to the current layer; and
    identifying a region of the image of the current layer based on a coordinate of a defect in the previous layer using the controller, wherein the region corresponds to the coordinate of the defect in the previous layer.

11. The method of claim 10, further comprising adjusting the die corners to a die coordinate system for the previous layer after aligning the design file for the previous layer.

12. The method of claim 10, further comprising generating lots with defect site images of the current layer and the previous layer using the controller.

13. The method of claim 10, further comprising deskewing the image of the current layer using the controller.

14. The method of claim 10, wherein the image of the current layer is a scanning electron microscope image.

15. The method of claim 10, further comprising aligning an image of the previous layer to at least one of the design file for the previous layer or the design file for the current layer.

16. The method of claim 10, further comprising identifying, using the controller, the location of a defect in an image of the previous layer prior to identifying the region of the image of the current layer.

17. The method of claim 16, further comprising aligning the image of the previous layer to the design file for the previous layer.

18. The method of claim 10, wherein one of the coordinate system for the current layer and the coordinate system for the previous layer is the grid-based system, and wherein the grid-based system uses an X-Y coordinate system.

* * * * *